United States Patent [19]
Yamamori

[11] 3,721,144
[45] March 20, 1973

[54] PUNCHING TOOL
[75] Inventor: Masaji Yamamori, Nagoya, Japan
[73] Assignee: Mitsubishi Monsanto Chemical Company, Tokyo, Japan
[22] Filed: Dec. 30, 1970
[21] Appl. No.: 102,782

[30] Foreign Application Priority Data

Feb. 25, 1970 Japan..................45/16095

[52] U.S. Cl.................................83/685, 83/689
[51] Int. Cl................................B26f 1/14
[58] Field of Search.........83/685, 689, 690, 684, 542

[56] References Cited
UNITED STATES PATENTS

| | | | |
|---|---|---|---|
| 2,893,489 | 7/1959 | Thompson | 83/685 |
| 38,750 | 6/1863 | Knickerbocker | 83/690 X |
| 675,526 | 6/1901 | Randall, Jr. | 83/685 X |
| 2,412,066 | 12/1946 | Shear | 83/689 X |
| 2,423,601 | 7/1947 | MacArthur | 83/689 X |

*Primary Examiner*—Frank T. Yost
*Attorney*—James E. Nilles

[57] ABSTRACT

A punching machine for cutting or forming workpieces from a synthetic resinous sheet having a number of formed vessels or the like thereon which comprises a steel die punch and a cutting die, characterized in that said steel die punch is provided with a fixed punching blade member and said cutting die with a flexible cutting blade member having portions resiliently slightly inflated inside of the punching blade member, said steel die punch being adapted to be forced to enter said cutting die by which the end of the steel die punch is surrounded to thereby attain a closest possible mating of said members for cutting or forming the workpieces with clean-cut peripheral edges.

8 Claims, 3 Drawing Figures

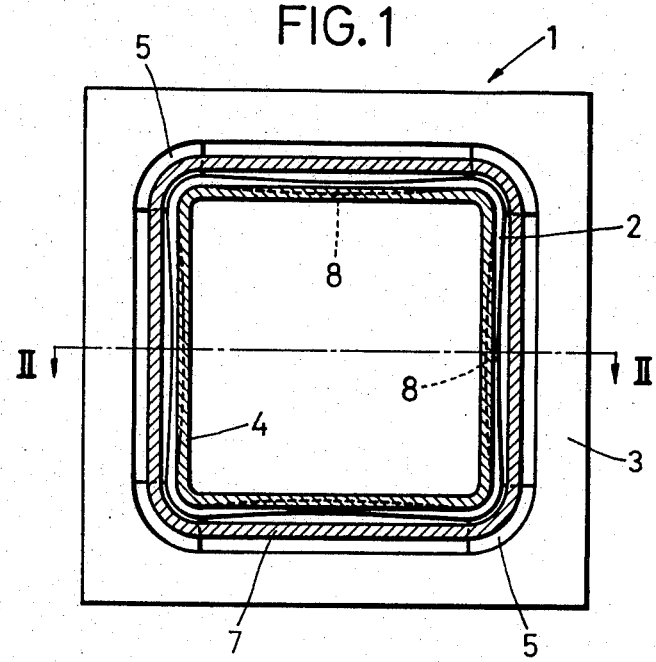
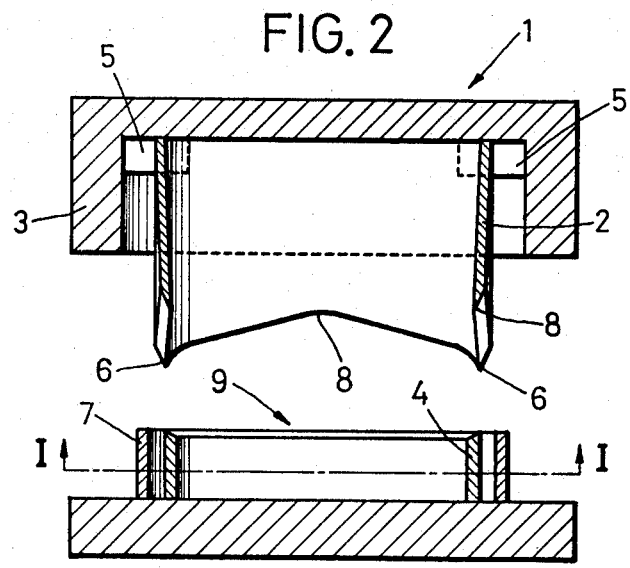

PUNCHING TOOL

The invention relates to a punching machine for use in the cutting or forming workpieces from a synthetic resinous sheet having a number of formed vessels or the like thereon and more particularly to a punching machine comprising a pair of mating tools by means of which finished workpieces having clean-cut peripheral cross-sections are produced from the synthetic resinous sheet.

Punching machines or die sets known in prior art for use in cutting or forming workpieces from synthetic resinous sheets may be classified basically into two groups, one of which belongs to the so-called post-trimming type puncheon comprising, as a pair of mating tools, a die and a punch and the other the shearing type puncheon comprising a shearing blade and a rigid block for receiving said blade. These conventional puncheons involve various problems having regard to the manufacture of puncheons themselves and the finishing of workpieces produced.

For the puncheon of the post-trimming type a least possible clearance between the punch and the die is a requirement of prime importance in that puncheon having a unduly large clearance produced between the die and the punch when placed in the mating position gives finished workpieces, which bear slivers on peripheral edges, representing rough-hewn surfaces on the peripheries whereby the commercial value of the workpieces are degraded, said slivers giving rise to difficulties in separating workpieces from the puncheon to thereby hinder continuous operation of the puncheon. Thus, puncheons of the post-trimming type ought to be made by skilled mechanics and involve much precise hand finishing, leading to a high cost for the manufacture.

As for the puncheon of the shearing type, a substantial force required for driving down the shearing blade results in a shorter life of the blade which in turn brings about frequent replacement of the blade blurred, which tends to produce workpieces bearing slivers or cracks on the peripheral edges. In an attempt to mitigate such disadvantages there has been proposed to provide the block for receiving the shearing blade with a vinylchloride sheet of the semi-hard type for the purposes of protecting the edge of the shearing blade from becoming blunt and of preventing the occurrence of slivers or cracks in the workpieces produced. However, this measure has been found unsatisfactory when stock sheet made from polystyrene or the like undergoes the cutting.

With the slit system, which has also been known in prior art a synthetic resinous sheet is subjected to cutting in the lengthwise and traverse directions, so that the profile of workpieces produced is limited to being rectangular or square, having pointed corners which tend to damage bags into which finished workpieces are packed.

To solve these problems the present invention provides a punching machine of the kind which comprises a flexible cutting blade member of a specific shape such as rectangular or round as desired and a fixed punching blade member, said two members being adapted to create, when out in the mating position, substantially no clearance between them. Thus, the workpieces produced from synthetic resinous sheets by means of the punching machine of the invention are substantially free from slivers which otherwise are produced on the peripheral cross-sectional areas of workpieces subjected to cutting.

Accordingly, an object of the invention is to provide a punching machine for use in the cutting or forming workpieces with clean-cut peripheral cross-sections bearing no slivers from synthetic resinous sheets, said punching machine comprising, as a pair of mating tools, a steel die punch and a cutting die, characterized in that said steel die punch is provided with a fixed punching blade member and said cutting die with a flexible cutting blade member having portions resiliently slightly inflated inside of the punching blade member, said steel die punch being adapted to be forced to enter said cutting die by which the end of the steel die punch is surrounded to thereby attain a closest possible mating of said members for cutting or forming the workpieces.

A preferred embodiment of the invention is illustrated by way of example in the accompanying drawings, in which:

FIG. 1 is the plan view partly in section of the embodiment taken along the line I—I of FIG. 2;

FIG. 2 is the cross-sectional view taken along line II—II of the embodiment shown in FIG. 1.

Figure 3:
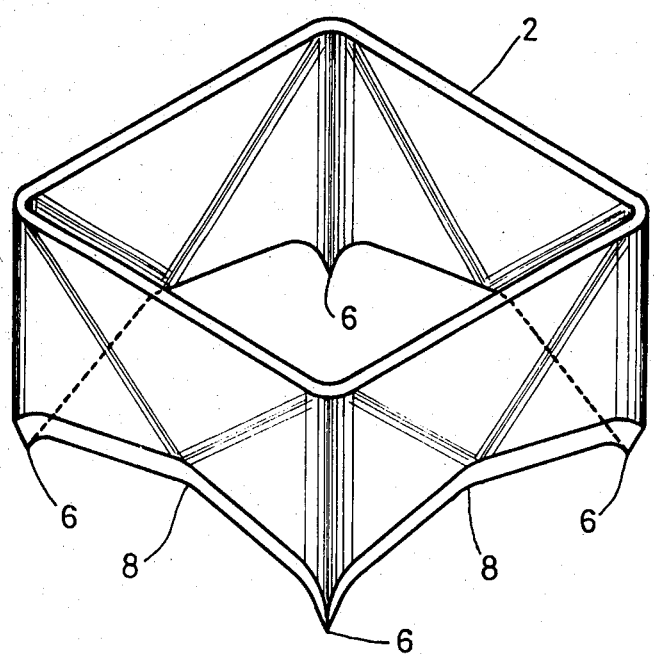
FIG. 3 is a diagrammatic view of the flexible cutting blade member of the embodiment.

In the drawings, a cutting die 1 has an endless flexible cutting blade member 2 welded thereto at four locations indicated at 5 between the overhang flange 3 of the cutting die and flexible cutting blade member 2 by use of DEVCON (trade-name of a ferro-cement manufactured and sold by a Japanese company named Japan Devcon K.K.), said flexible cutting blade member being made from for example SANDVIK DIEFLEX (trade-name of a steel strip manufactured and sold by a Swedish company named SANDVIK) which has been subjected to quenching before employment. The flexible cutting blade member has portions resiliently slightly inflated towards the center of the cutting die between two adjacent corners indicated at 5 as welds; the height of the blade is tapered off towards the midpoint indicated at 8 of each of four sides as illustrated; and the cutting blade member may be formed with an acute, protrudent edge 6 each on four corners which facilitate the initiation of cutting stock sheet by piercing it. The steel die punch 9 has a upright punching blade member 4, which is fixed thereto in a manner such that the edges of the blade member 4 is positioned slightly outside in respect of inflated portions of the flexible cutting blade member 2 excepting when cutting is effected. Naturally, the end of the punching blade member 4 is surrounded by the cutting blade member 2 when they are in the mating position. The steel die punch is provided with supports 7 on which a stock sheet rests when it is subjected to the piercing by the acute edges 6 which is followed by the cutting of workpieces out of the sheet.

It will be appreciated that although the punching machine shown in the drawings has been described as being of a rectangular type with round corners, it may be of any other types such as the round type or the elliptical type, and that the acute edge may be either single or of a plurality depending on the shape of stock sheet subject to cutting or may be dispensed with in the case where the fixed punching blade member has corners of a small curveture.

The operation of the punching machine of the invention is illustrated.

At the outset a stock sheet made of synthetic resin having a number of formed vessel to be cut thereon is inserted between the punching blade member 4 fixed to the steel die punch and the flexible cutting blade member 2 of the cutting die. The formed vessel may be a plate or cup or of any other form. The cutting die is then moved in a manner known per se towards the stationary steel die punch (alternatively, the steel die punch may be moved towards the cutting die, which is made stationary) to thereby permit the acute edges 6 of the flexible cutting blade member 2 to pierce into the stock sheet whereby cuts form in the sheet. Further movement of the steel die punch towards the cutting die results in a close contact by being initiated from said cuts between the punching blade member 4 of the steel die punch and the flexible cutting blade member 2 having respective mid-portions of four sides thereof slightly inflated towards inside of the cutting die, leaving substantially no clearance between the cutting punch and the steel die when placed in the mating position to effect the cutting of a workpiece out of the stock sheet by employing a very small shearing force just as required for a scissors to cut a piece of cloth. Thus, the punching machine according to the invention provides workpieces having clean-cut peripheral cross-sectional areas free from slivers or cracks.

The punching machine of the invention necessitates thus only a very small shearing force for cutting workpieces of higher commercial value out of a synthetic resinous sheet, without requiring such a high degree of accuracy in the finishing of the device manufactured as is required for known puncheons of the post-trimming type. Further, by virtue of the less requirement for the shearing force which makes for the durability of sharpness of edges of the cutting blade member, the punching machine of the invention need not such frequent replacement of cutting blade member as is required for those of the shearing type. As the results, costs for the manufacture and expenses required for the maintenance of the punching machine are appreciably reduced according to the invention. Still further, successive cutting of workpieces may be effected by the punching machine according to the invention with a simple adjustment of members of the punching machine, leading to a lower production cost of finished workpieces.

Although the invention has been described with synthetic resinous sheets, it will be understood that the punching machine of the invention may also be used in cutting workpieces out of other types of sheet such as synthetic paper, corrugated cardboard, cotton cloth incorporated paper, and light metal sheets.

I claim:

1. A punching machine for cutting or forming workpieces of a shape as desired from a synthetic resinous sheet having a number of formed vessels or the like thereon, which comprises, as a pair of mating tools, a steel die punch and a cutting die, characterized in that said steel die punch is provided with a fixed punching blade member and said cutting die with a flexible cutting blade member having portions resiliently slightly inflated inside of the punching blade member, said fixed punching blade member and said flexible cutting blade member each having a continuous cutting edge, said steel die punch being adapted to be forced to enter said cutting die by which the end of the steel die punch is surrounded to thereby attain a closest possible mating of said members for cutting or forming the workpieces.

2. A punching machine as defined in claim 1 which comprises a steel die punch provided with a fixed punching blade member and a cutting die provided with a flexible cutting blade member of rectangular, round corner type to produce workpieces of rectangular shape.

3. A punching machine as defined in claim 1 in which the flexible cutting blade member has a round cross-section to cut workpieces of round shape.

4. A punching machine as defined in claim 1, in which the flexible cutting blade member attached to the cutting die is made from a flexible steel strip.

5. A punching machine for cutting or forming workpieces of a shape as desired from a synthetic resinous sheet having a number of formed vessels or the like thereon, which comprises, as a pair of mating tools, a steel die punch and a cutting die, characterized in that said steel punch is provided with a fixed punching blade member and said cutting die with a flexible cutting blade member having portions resiliently slightly inflated inside of the punching blade member, said flexible cutting blade member being of rectangular, round corner type to produce workpieces of rectangular shape and being formed with a protrudent edge portion each at four corners thereby to facilitate the initiation of cutting, said steel die punch being adapted to be forced to enter said cutting die by which the end of the steel die punch is surrounded to thereby attain a closest possible mating of said members for cutting or forming the workpieces.

6. A punching machine as defined in claim 5 wherein said flexible cutting blade member is of a rectangular, round corner type, the midportion between two adjacent corners being tapered off in the height towards the respective centers.

7. In a machine for cutting pieces from sheet material and comprising a die punch and a relatively movable mating cutting die:

a punching blade member for said die punch, and a flexible cutting blade member for said cutting die, said flexible cutting blade member having a first portion of its mating surface in alignment with the mating surface of said punching blade member and having a second portion of its mating surface resiliently inwardly bowed with respect to the mating surface of said punching blade member, said first portion of said flexible cutting blade member being adapted to mate with the mating surface of said punching blade member prior to the mating of the second portion as said blade members come together so that said resiliently inwardly bowed second portion of said flexible cutting blade is forced to flex into alignment and the closest possible mating relationship with the mating surface of said punching blade member.

8. A machine as defined in claim 7 wherein said punching blade member is rigid.

* * * * *